US008869055B1

(12) United States Patent
Korsky et al.

(10) Patent No.: US 8,869,055 B1
(45) Date of Patent: Oct. 21, 2014

(54) UNIVERSAL ITEM LOCATOR AND ACQUISITION TOOL

(75) Inventors: Ross V. Korsky, Auburn, WA (US); Eric Sven Kruller, Duvall, WA (US); Arjun Subramanian, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 325 days.

(21) Appl. No.: 12/915,254

(22) Filed: Oct. 29, 2010

(51) Int. Cl.
*G06F 3/048* (2013.01)

(52) U.S. Cl.
USPC .................... 715/765; 715/741; 715/751

(58) Field of Classification Search
None
See application file for complete search history.

(56) References Cited

U.S. PATENT DOCUMENTS

| 7,975,020 | B1 | 7/2011 | Green et al. |
| 8,161,411 | B2 * | 4/2012 | Robbin et al. ................ 715/854 |
| 8,327,276 | B2 * | 12/2012 | Shroff et al. ................. 715/751 |
| 8,364,540 | B2 * | 1/2013 | Soroca et al. ............. 705/14.64 |
| 2003/0182658 | A1 * | 9/2003 | Alexander ..................... 725/60 |
| 2008/0126476 | A1 * | 5/2008 | Nicholas et al. .............. 709/203 |
| 2009/0018898 | A1 * | 1/2009 | Genen ............................ 705/10 |
| 2010/0241968 | A1 * | 9/2010 | Tarara et al. .................. 715/751 |
| 2011/0043652 | A1 * | 2/2011 | King et al. ................ 348/222.1 |

* cited by examiner

*Primary Examiner* — Anil N Kumar
(74) *Attorney, Agent, or Firm* — Lee & Hayes, PLLC (57) ABSTRACT

A service may enable users to store and/or acquire items that are identified from an electronic source without leaving the source. A service may identify items included in content that is available from one or more content providers (e.g., social networking sites, electronic news, product reviews, etc.). The identified items may be matched with specific items available from the service. The service may associate a designator, which may be placed proximate the description of the item in the content that is published by the content provider. A user may select the designator (link, button, etc.) to acquire the item from the service or store information about the item in a user account maintained by the service.

21 Claims, 12 Drawing Sheets

UNIVERSAL ITEM LOCATOR AND ACQUISITION TOOL

BACKGROUND

People are able to readily access vast amounts of information from networked electronic sources such as through use of the Internet. For example, people can access news reports, social networking sites, blogs, consumer reviews, and electronic marketplace, to name just a few types of resources available using electronic sources. Much of this information is unassociated with other available information that is provided by other sources, which can make coordination and sharing of the information difficult. When a person locates useful information from a first source, the person may have to manually store the information or otherwise manual add it to another source to obtain an intended result. For example, when a user encounters an unknown word from an initial source, the user may navigate to another source that is capable of defining the word before resuming interaction with the initial source. However, in some instances, people do not have an immediate need for information and thus lack an easy and efficient way to store the information (e.g., the unknown word, etc.) over a period of time.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to techniques and systems to enable users to store item information and/or acquire items that they identify from an electronic source without leaving the source. In accordance with embodiments, a service may identify items included in content that is available from one or more content providers (e.g., social networking sites, electronic news, product reviews, etc.). The content may include a portion or all of a page (e.g., source code, text, and images, or a portion thereof). The content may be text, images, videos, or other types of media. The identified items may be matched with an item made available for consumption from the service, such as by purchase, lease, or other arrangements. In some embodiments, the service may associate a designator with the text of the item, which may be displayed by the content provider. A user may select the designator (link, button, icon, etc.) to acquire the item from the service or associate the item with the user via a user account with the service. Items may include tangible items, digital items, services, media, or anything else a user may consume and/or acquire from the service or any other entity.

In various embodiments, a user may request item recommendations from other users or friends. The service may link the recommended items via the designators to items available for consumption form the service. The user may then acquire or store the items in a user account for future reference. For example, the user may save the items to an item registry, wish list or other item tracker.

The techniques and systems described herein may be implemented in a number of ways. Example implementations are provided below with reference to the following figures.

Figure 1:
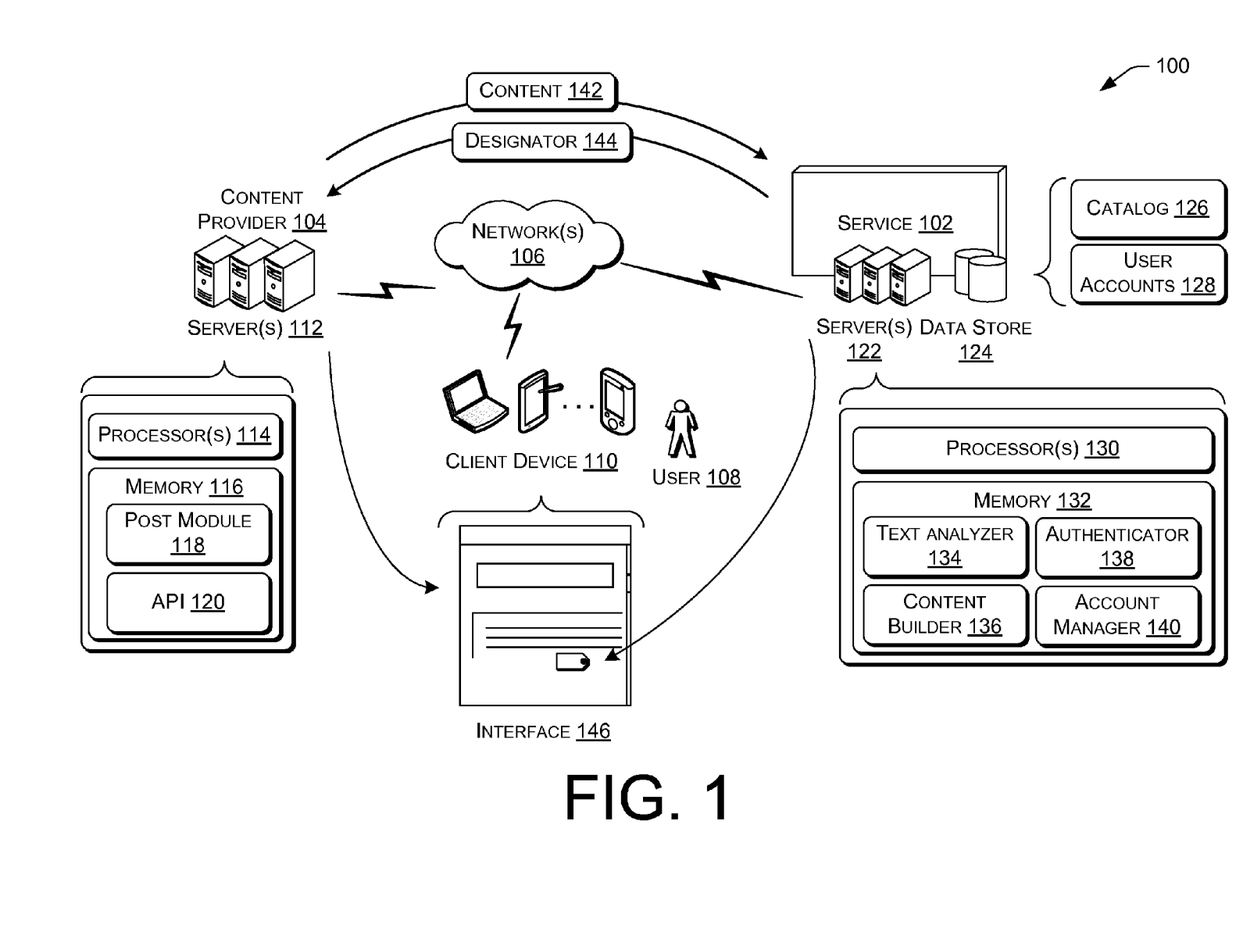
FIG. 1 is a schematic diagram of an illustrative computing environment to provide a universal item locator and acquisition tool.

FIG. 1 is a schematic diagram of an illustrative computing environment 100 to provide a universal item locator and acquisition tool. In accordance with one or more embodiments, the environment 100 may include a service 102 that is capable of analyzing content made available from a content provider 104 via network(s) 106. A user 108 may interact with the service 102 and/or the content provider 104 via a client device 110.

The client device 110 may include a personal computer, an electronic book reader (eBook reader), a tablet computer, a mobile telephone (including smartphones), a personal digital assistant (PDA), a television, a set top box, a gaming console, or another electronic device that can receive electronic data and enable a user to interact with the electronic data.

The content provider 104 may publish or otherwise make content available using servers 112 that transmit data across the network(s) 106 in response to requests from the user 108 or other entities. The content provider 104 may include processor(s) 114 and memory 116 to store various applications, modules, and/or components. In some embodiments, the memory 116 may include a post module 118 and an application program interface (API) 120 among other possible modules that, when executed by the processor(s) 114, may perform various actions described herein with reference to the content provider 104. The post module 118 may enable the content provider 104 to post content to make the content available to various users. The interface module 120 may enable entities, such as the service 102, to interact with the content provider 104. In some embodiments, the API 120 may enable the service 102 to access and/or modify content that is posted via the post module 118.

The service 102 may include servers 122 and a data store 124. The data store 124 may store a catalog 126 of items that are made available from or otherwise recognized by the service 102. The catalog may include a relationship between generic items and/or groups of items (which may be mentioned in the content provided by the content provider) and specific items (which may be available for consumption from the service 102). The data store 124 may also store user accounts 128 associated with various users, such as the user 108. The user accounts 128 may include transaction history, browsing history, payment information, addresses, stored items, and/or other user information. The service 102 may be a dedicated repository of the item information or the service 102 may collect and store data as a secondary function, such as along with managing other user data, providing services to the user 108, or performing other operations for the user (e.g., transacting goods/services with the user, etc.).

The servers 122 may include processor(s) 130 and memory 132. The memory 132 may include a text analyzer 134, a content builder 136, an authenticator 138, and an account manager 140, among other possible modules that, when executed by the processor(s) 130, may perform various actions described herein with reference to the service 102.

The text analyzer 134 may analyze content 142 posted by the content provider 104 via the post module 118. In accordance with various embodiments, the text analyzer 134 may identify items in the content 142, which may be associated with items in the catalog 126. In some instances, the text analyzer 134 may identify a generic item or category of items in the content 142 which may then be associated with a specific item in the catalog 126. For example, a generic term such as "dictionary," when included in the content 142 from the content provider 104, may be linked to a specific item such as "Webster's Dictionary®," which may be available from the service 102.

The content builder 136 may generate a designator 144 for the item in accordance the API 120. For example, the content builder 136 may embed a link with the identified item (text) in the content 142 provided by the content provider 104. In some embodiments, the designator 144 may be an icon or other representation that signifies the item and that, when selected by a user, enables the user to store the item and/or acquire the item from the service 102. In various embodiments, the content builder 136 may generate a response to the content, such as when the content is a post in a message board, to enable providing the designator with the item via the content provider 104. Thus, the service 102 may post content with one or more of the designators using the content provider 104 via the post module 118.

The authenticator 138 may enable the user 108 to access a user account maintained by the service 102. For example, the service 102 may store user information in a user account that is accessible to the user upon entry of correct user credentials (e.g., user name, password, token(s), cookies, etc.).

The account manager 140 may store item information for the user and, in some instance, enable the user to acquire the item from the service 102. For example, when the user selects the designator 144 via posted content from the content provider 104, the user may store information about the item. The information may be stored automatically or by way of further user interactions (e.g., user selections, user inputs, etc.). The account manager 140 may enable the user 108 to store the item information in a list, such as an item registry, a wish list, a cart, or another item tracker. In various embodiments, the account manager 140 may enable the user 108 to acquire the item shortly after selecting the designator or after a longer passage of time. The item may be acquired via the network(s) 106, via physical delivery, or by other means depending on the type of item.

The client device 110 may render a user interface (UI) 146 that includes the content 144 from the content provider 104, such as a post, message, or other data. In addition, the UI 146 may include the designator 144, which enables the user 108 to store and/or acquire item information associated with an item, category of items, or other text associated with an item via the text analyzer 134. The user 108 may then select the designator 144 by way of the UI 146 and thereby access information about the item to store item information in a user account and/or acquire the item.

Although FIG. 1 only shows a single content provider 104, the service 102 may interact with many other content providers as described herein. Thus, the service 102 may provide the service disclosed herein across multiple content providers in addition to the content provider 104 and thereby provide users with additional opportunities to associate (store) and/or acquire items via a user account with the service 102.

Figure 2:
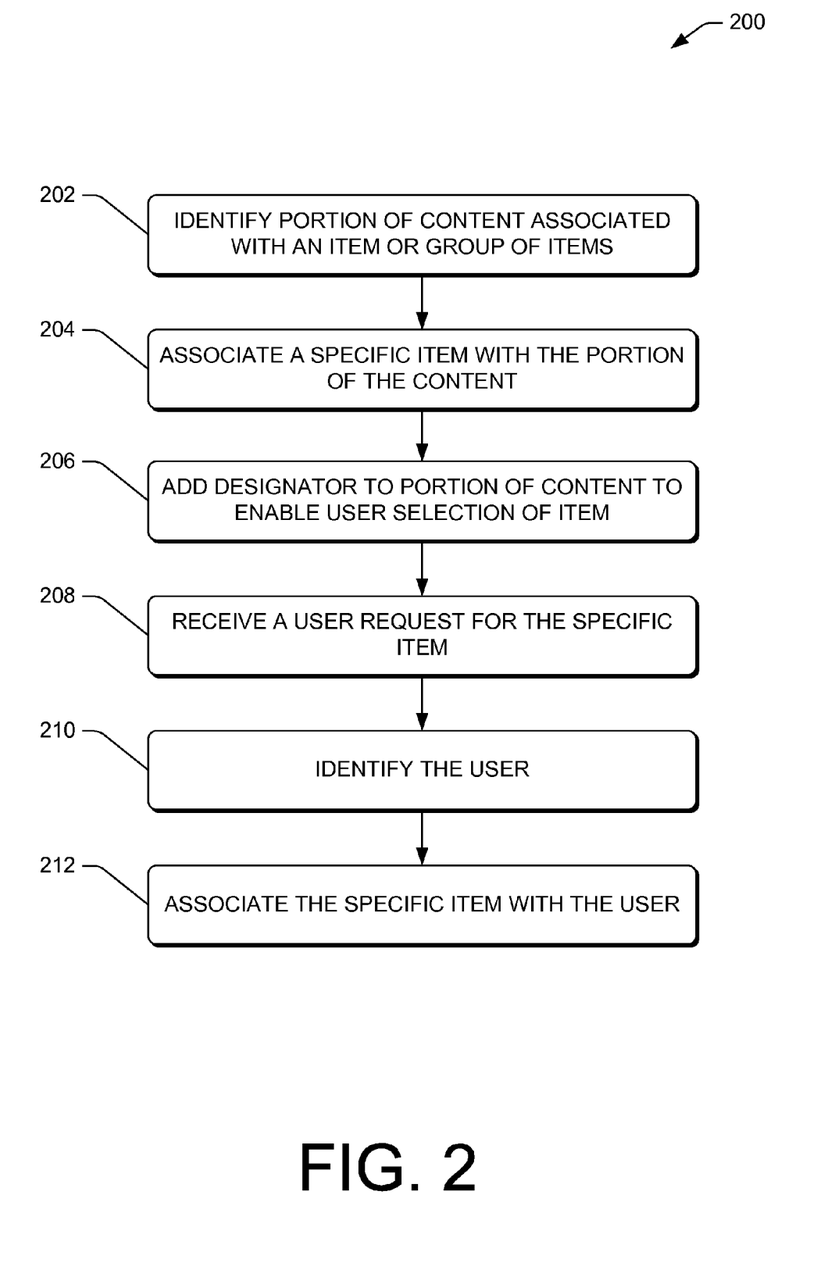
FIG. 2 is a flow diagram of an illustrative process to locate an item and then enable a user to acquire the item or associate the item with the user.

FIG. 2 is a flow diagram of an illustrative process 200 to locate an item and then enable a user to acquire the item or associate the item with the user. The process 200 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly. The process 200 is described with reference to the environment 100 of FIG. 1.

At 202, the text analyzer 134 of the service 102 may identify a portion of the content 142 that is associated with an item or a group of items. The text analyzer 134 may perform queries against the catalog 126 using words or phrases from the content 142 during the identification at 202. The text analyzer 134 may identify a generic item name and/or a grouping of items (e.g., a category, subcategory, class, etc.) in the content 142 that may be associated to one or more specific items that may be acquired from the service 102.

At 204, the text analyzer 134 may associate a specific item with the portion of the content 142. In some instances, the association may be a one-to-one relationship where only a single specific item may match the portion of the content 142 identified at the operation 202. However, when a one-to-many relationship exists and many specific items match a description of the identified portion, then the text analyzer 134 may select a representative item from the many specific items to associate with the portion of the content. Regardless, the text analyzer 134 may ultimately associate a single specific item with the portion of the content.

At 206, the content builder 136 may add the designator 144 to the portion of the content to enable user selection of the specific item. The content builder 136 may imbed information associated with the specific item in a link, an icon, or using other techniques to generate the designator, which when selected by a user, provides access to the specific item. The designator 144 may also be used to signify a presence of the specific item that is associated with the portion of the content. By adding the designator, the service 102 enables users to associate items and/or acquire items the users discover from the content provider 104 without navigating to the other sites, such as a site hosted by the service 102.

In accordance with embodiments, the service 102 may add one or more designators to the content 142. In some instances, the service 102 may batch process the content 142 and to add the designators. The service 102 may also add the designators during ongoing events, such as when new content is added by the content provider 104 (e.g., a new message, post, etc.).

At 208, the service 102 may receive a request from the user 108 for a specific item by selecting the designator 144 for the portion of content. For example, the user 108 may select a link, an icon, or another representation of the designator 144. In some embodiments, the designator 144 may initiate the request directed from the user to the service 102 while the user remains on a site hosted by the content provider 104.

At 210, the service 102 may identify the user 108. In some embodiments, the authenticator 138 may identify the user 108 via user credentials provided via a pop-up or mini layer. In various embodiments, the user credentials may be stored in advance (such as via cookies, tokens, etc.) and, therefore, may not be required each time the user select one of the designators.

At 212, the service 102, via the account manager 140, may associate the specific item with the user 108. In some embodiments, the association may be based on user input, such as a selection of a type of association of the specific item. For example, the user 108 may choose to acquire the item, add the item to a virtual cart, add the item to an item registry, and so forth. The account manager 140 may process the item as requested by the user 108 based on a default setting and/or a user selection. The user 108 may then continue browsing the content from the provider without having to redirect back to a site hosted by the content provider 104.

The service 102 may interact with the content provider 104 to perform the process 200. In some embodiments, the service 102 may include an application that is executed by the content provider 104. When a user activates the application, the service 102 may gain access to the content 142, which may then enable the service 102 to begin the operation 202. In various embodiments, the content provider 104 may transmit the content 142 to the service 102, such as under a predetermined arrangement, to enable the service to identify the specific items, add the designators, and so forth. The service 102 may then send the content back to the content provider 104 for publication of the content with the designators.

In the next section, various embodiments are presented that show the designators implemented with the content 142.

Illustrative Item Designators

FIGS. 3-7 are illustrative presentations of text that include items located in content and associated designators to enable users to acquire an item or associate the item with a respective user. The illustrative presentations include content generated by the content provider 104 and posted by the post module 118.

Figure 3:
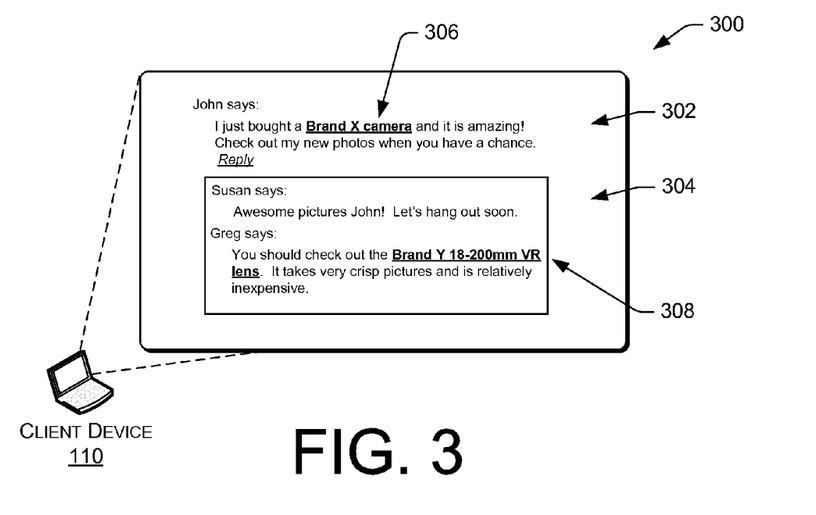
FIGS. 3-7 are illustrative presentations of text that includes items located in content that are associated with designators to enable users to acquire the items or associate the items with a respective user.

FIG. 3 shows an illustrative environment 300 that includes that includes a message 302 by an author "John" and a number or replies 304 to the message. The content 300 includes a first designator 306 associated with a portion of the message 302. In addition, the content 300 also includes a second designator 308 associated with one of the replies 304.

As shown in FIG. 3, the designators 306 and 308 are represented as stylized text. The stylized text may include an underline, italic text, bold text, colored text, a different font, and/or a combination thereof to offset the designator from the other text in the content. The stylized text may be used to change the text of the portion of content associated with the specific item, and thereby signify a presence of the specific item. By using the stylized text, the content in the environment 300 is unaltered by the service 102.

Figure 4:
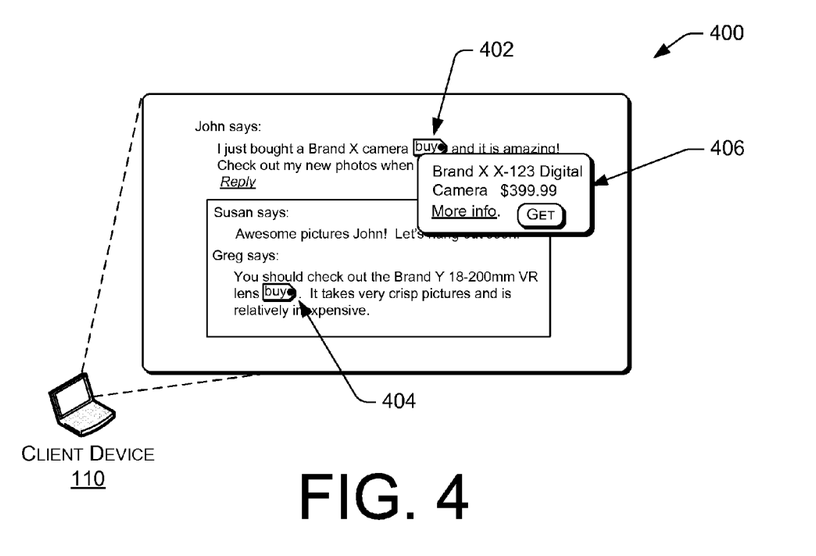

FIG. 4 shows an illustrative environment 400 that includes the same content shown in FIG. 3, but included designators 402 and 404 that are represented as icons to signify specific items associated with portions of the content. The icons may be located proximate the portion of content that is associated with the specific item.

In some embodiments, additional information 406 may be rendered when the user 108 hovers over or selects the icon or the stylized text (shown in FIG. 3). For example the user 108 may be presented with the specific item, a price, and so forth.

Figure 5:
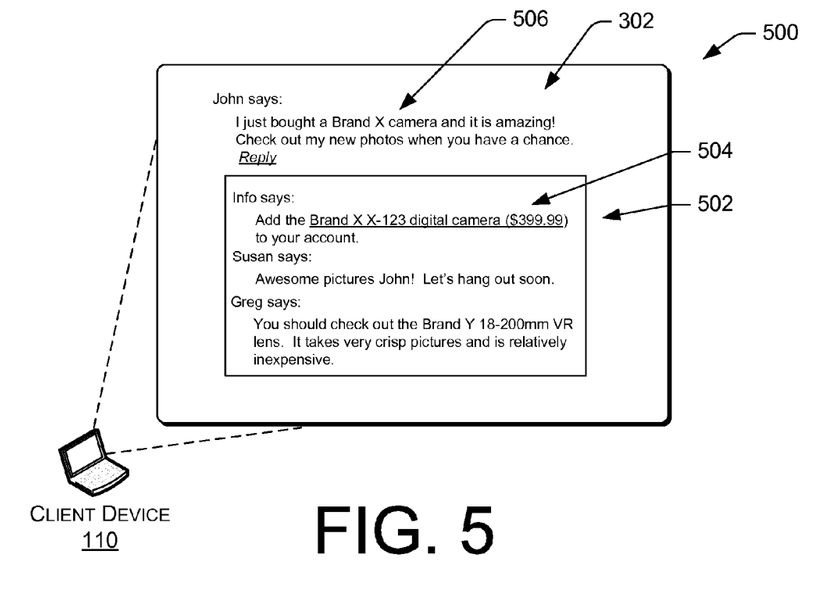

FIG. 5 shows yet another illustrative environment 500 that includes the message 302 from FIG. 3. The replies 304 include an item reply 502 that includes a designator 504 and information about a specific item associated with an item or group of items in a portion 506 of the message. For example, the portion 506 of "Brand X camera" in the message 302, when analyzed by the text analyzer 134, may result in the content builder 136 creating the item reply 502 of text and the designator 504 of a specific item, such as "Brand X X-123 digital camera" along with other information such as a price. The user 108 may then select the designator 504 to acquire or associate the item with the user via a user account with the service 102.

Figure 6:
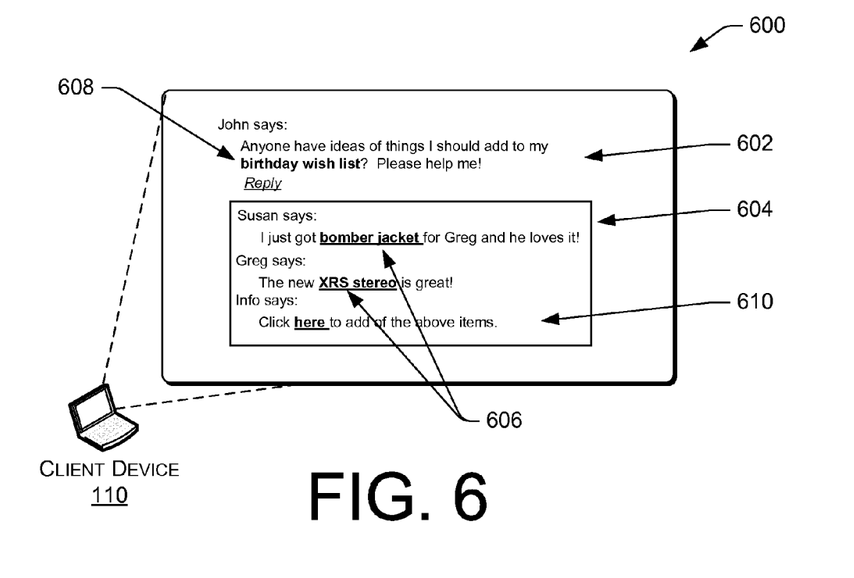

FIG. 6 shows yet another illustrative environment 600 that includes content from the content provider 104 and specific items that are identified by the service 102 by way of designators. A message 602 includes a request to recommend items for an item list, such as a "birthday wish list." Other users may submit replies 604 to the message 602 to contribute item recommendations to the birthday wish list. In accordance with embodiments, the replies 604 may include designators 606 using any of the various techniques described above. In some embodiments, the specific items, when selected by the user 108, may be added to a specified item list 608, such as the "birthday wish list" that is specified by the user 108 in the message 602. The replies 604 may also include a reply 610 from the service 102 that enables the user 108 to add all the items from the replies 606 to a user account of the user. In some embodiments, the replies may be automatically added to the user account without further action by the user 108.

Figure 7:
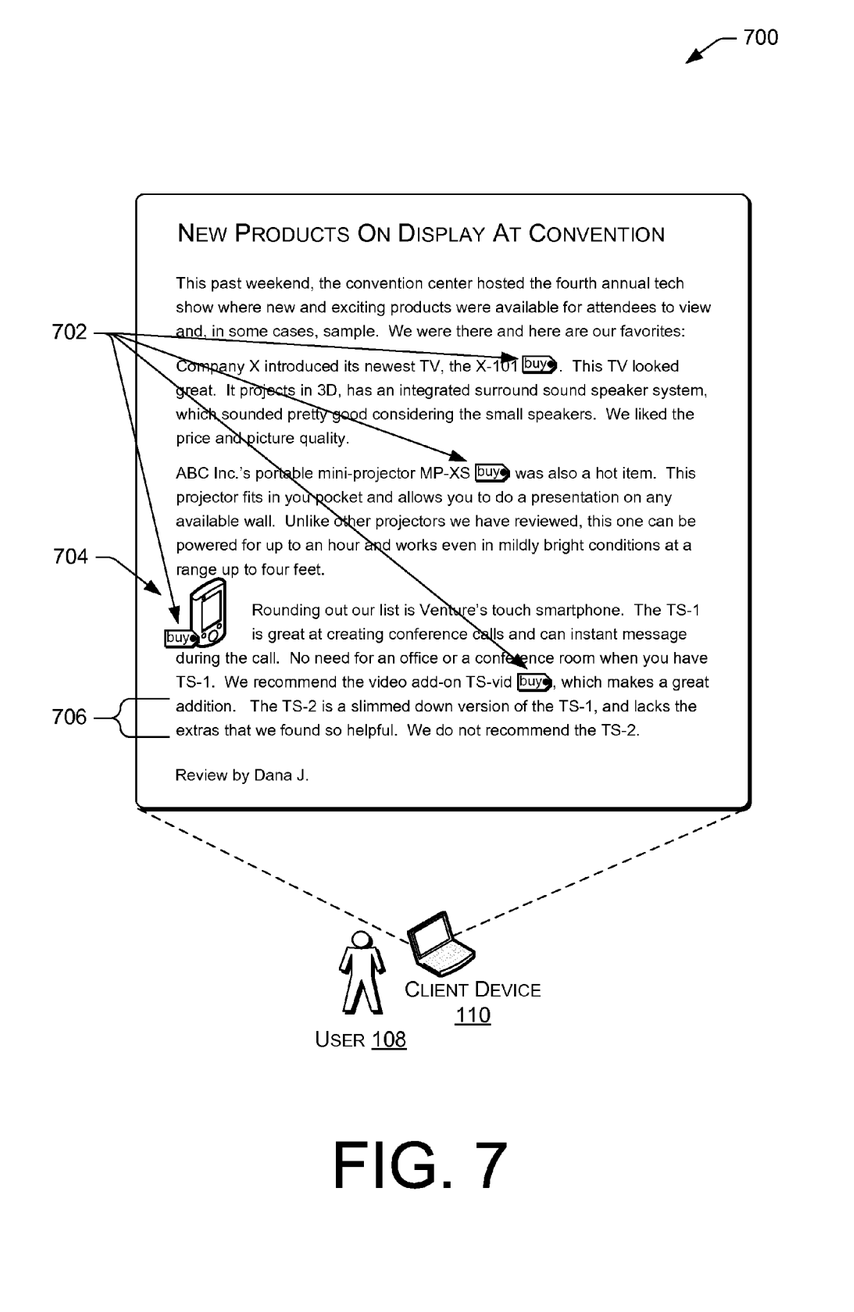

FIG. 7 shows another illustrative environment 700 that includes content from the content provider 104 and designators 702 from the service 102, which are associated with and signify various items or groups of items discussed in the content. For example, the content may be a news article, a review, or other static or dynamic text. In some embodiments, the content may include an image 704, such as a still image, a video, an icon, etc., that may represent an item or include item information by way of metadata of the image (e.g., name, image information, etc.). One of the designators 702 may be associated with the image 704 to enable the user 108 to acquire and/or associate a respective specific item with the user account.

In accordance with various embodiments, the service 102 may omit creation of designators for some instances of an item or group of items. In some instances, the service 102 may omit the designators because the item was previously associated with a designator (although some designators may be repeated), the number of items in the content exceeds a threshold value which limits the creation of designators, the item includes negative commentary, and/or for other reasons. Illustrative negative feedback is shown in the circumscribed (dashed line) text 706, which does not include a designator because the "TS-2" is discussed as "lacks" and "do not recommend" in sentences that mention this item.

Illustrative Operations

Figure 8:
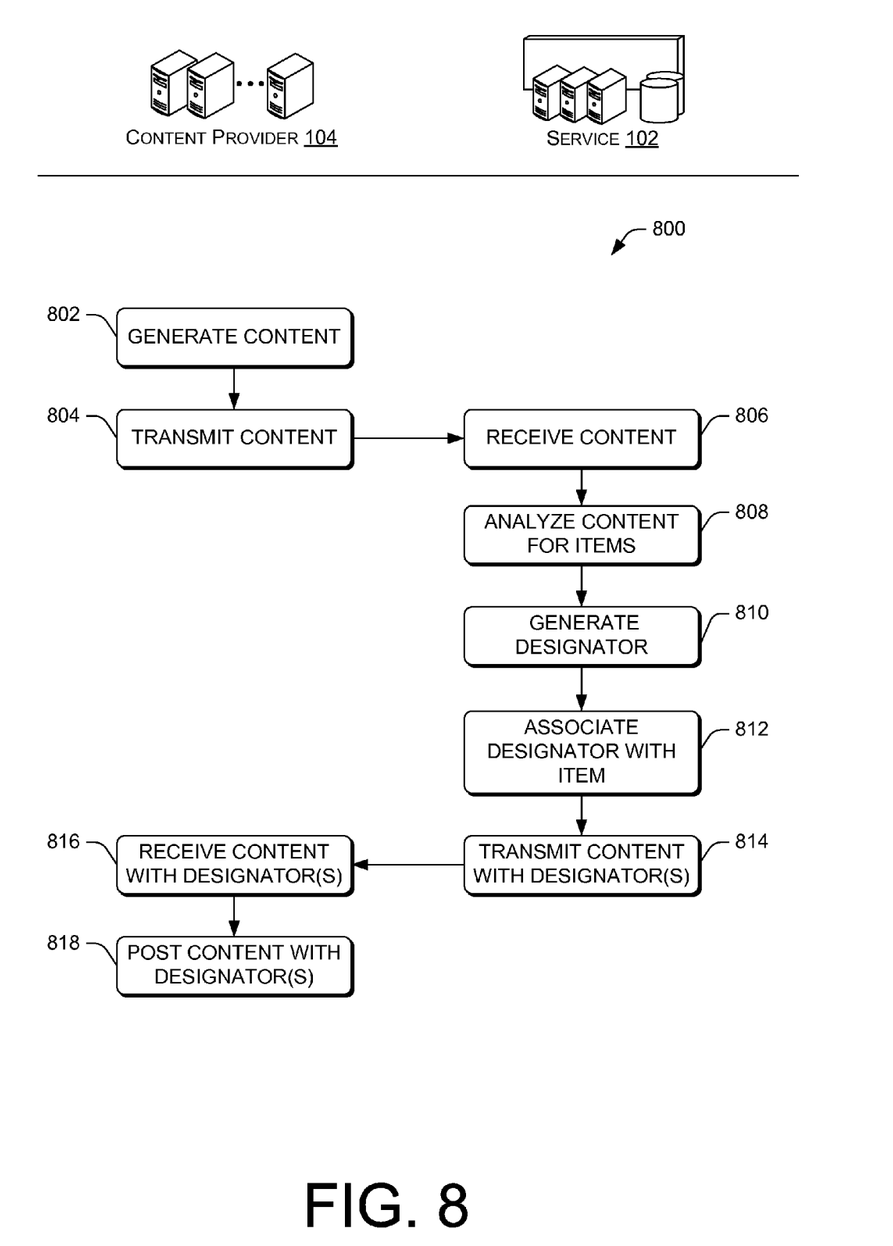
FIG. 8 is a flow diagram of an illustrative process to locate an item in text and provide a designator associated with the item.
Figure 9:
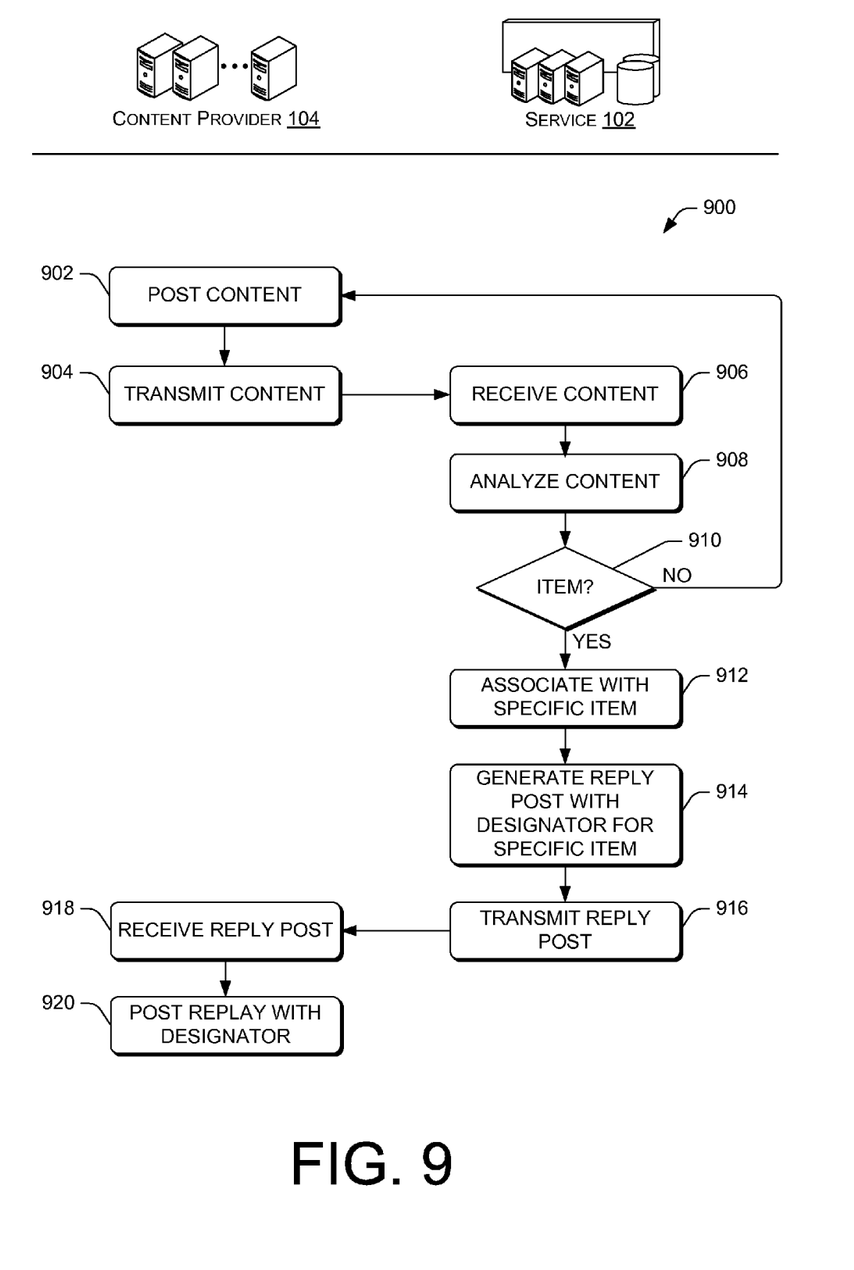
FIG. 9 is a flow diagram of an illustrative process to locate an item in a message and provide a reply to the message that includes a designator associated with the item.

FIGS. 8 and 9 show illustrative processes to locate an item based in part on interactions between the service 102 and the content provider 104. The processes are arranged under a respective party (the service 102 and/or the content provider 104) that may perform an operation. However, other entities may perform the operation, or a similar operation, and thus the arrangement of the operations and respective parties is not limited by the arrangement shown in FIGS. 8 and 9.

FIG. 8 is a flow diagram of an illustrative process 800 where the content provider 802 transmits the content to the service 102, which in turn creates the designator and then transmits the content and/or designator(s) back to the content provider for publication.

At 802, the content provider 802 may generate the content 142. At 804, the content provider 802 may transmit the content to the service 102, which may be received at 806.

At 808, the service 102 may analyze the content using the text analyzer 134 to identify items or groups of items. In various embodiments, the service 102 may query the catalog 126 to match a portion of the content to specific items stored in the catalog. In some instances, the text analyzer 134 may select one specific item from a number of specific items that match the query.

At 810, the service 102 may generate the designator 144 for the specific item using the content builder 136. At 812, the content builder 136 may associate the designator with the content 142.

At 814, the service 102 may transmit the content 142 and the designator 144 or multiple designators to the content provide 104, which may be received by the content provider at 816. At 818, the content provider 104 may post the content with the designator(s) via the post module 118.

In some embodiments, the process 800 may be performed as a patch process after the content is created and/or after the content is updated by the content provider 104. In various embodiments, the content 142 may be transmitted from the content provider 104 by way of inputs directly from the user to the service 102. For example, the service 102 may host an application that runs on the content provider 104, such as via the API 120. Users may generate content such as posts, blogs, or other content into the application that is hosted by the content provider 104 but managed by the service 102. In such an implementation, the service 102 may piggyback off the content provider 104 to perform the process 800 (e.g., fun an application supported by an environment hosted by the content provider, etc.). In yet another implementation, the content provider 104 may post content without the designators, transmit the content to the service to add the designators, and then update (revise) the content to include the designators in accordance with the process 800.

FIG. 9 is a flow diagram of an illustrative process 900 where the content provider 802 transmits the content (or portion thereof) (e.g., a message or post, etc.) to the service 102, which in turn adds the designator and then replies back to the content provider to publish the designator as a reply message (or post).

At 902, the content provider 104 may post content, such as a user generated message. At 904, the content provider 104 may transmit the content to the service provider 102, which may be received at 906. In some embodiments, the service provider 102 may actively obtain the content from the service, such as by scraping a site or otherwise monitoring a site to identify text, such as by use of interne robots (bots) that crawl content available from the content provider 104.

At 908, the service 102 analyzes the content. At 910, the service 910, via the text analyzer 134, determines whether an item is discussed in the content. When no item is discussed and thus identified at 908, then the process may continue at the operation 902. However, when an item is identified at 910, the process may continue at 912 where the text analyzer 134 may associate a specific item with a portion of the content.

At 914, the content builder 136 may generate a reply post with a designator for the specific item. At 916, the service 102 may transmit the reply post to the content provider 104, which may be received at 918. At 920, the content provider may post the reply with the designator using the post module 118. Thus, the process 900 may enable creation of the environment shown and described with reference to FIG. 5.

Illustrative Locator Criteria

Figure 10:
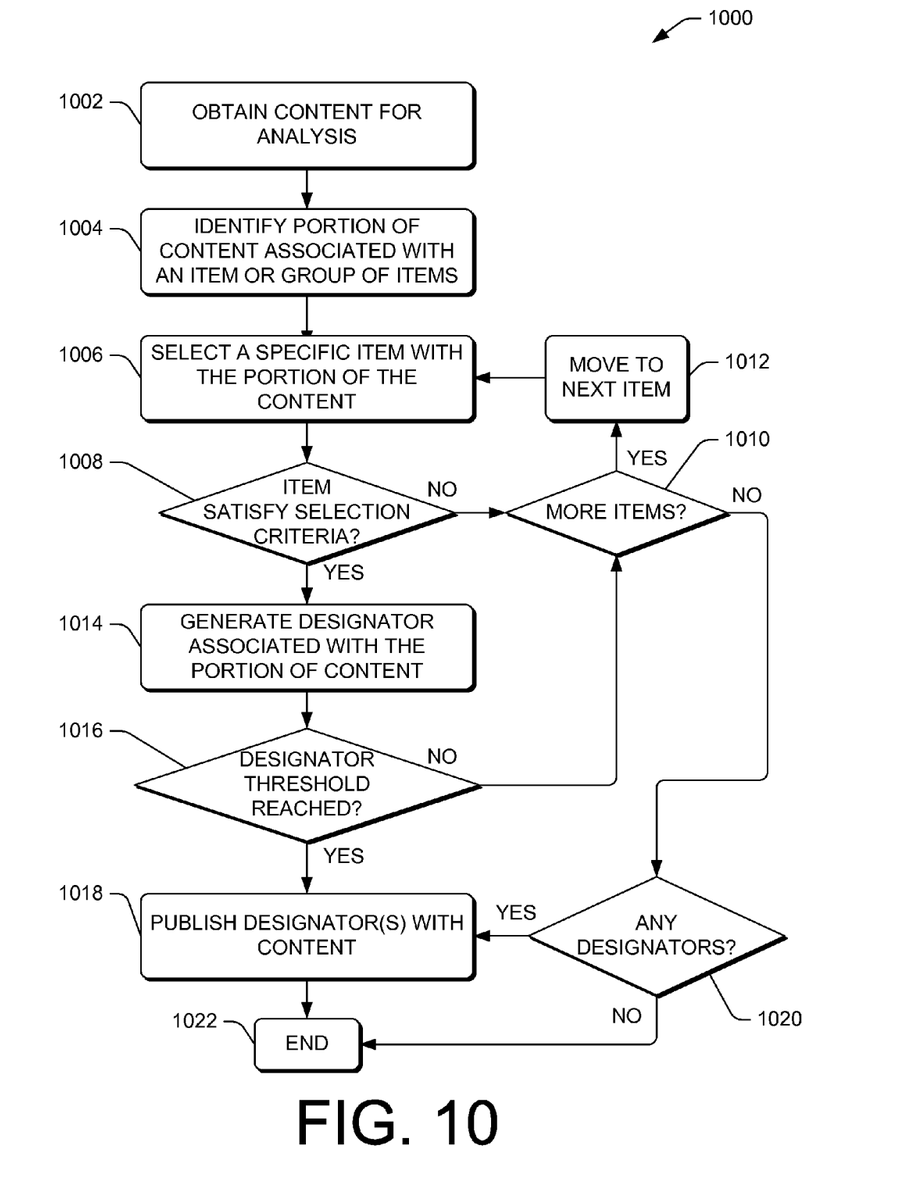
FIG. 10 is a flow diagram of an illustrative process to use criteria to select an item for association with a designator.
Figure 11:
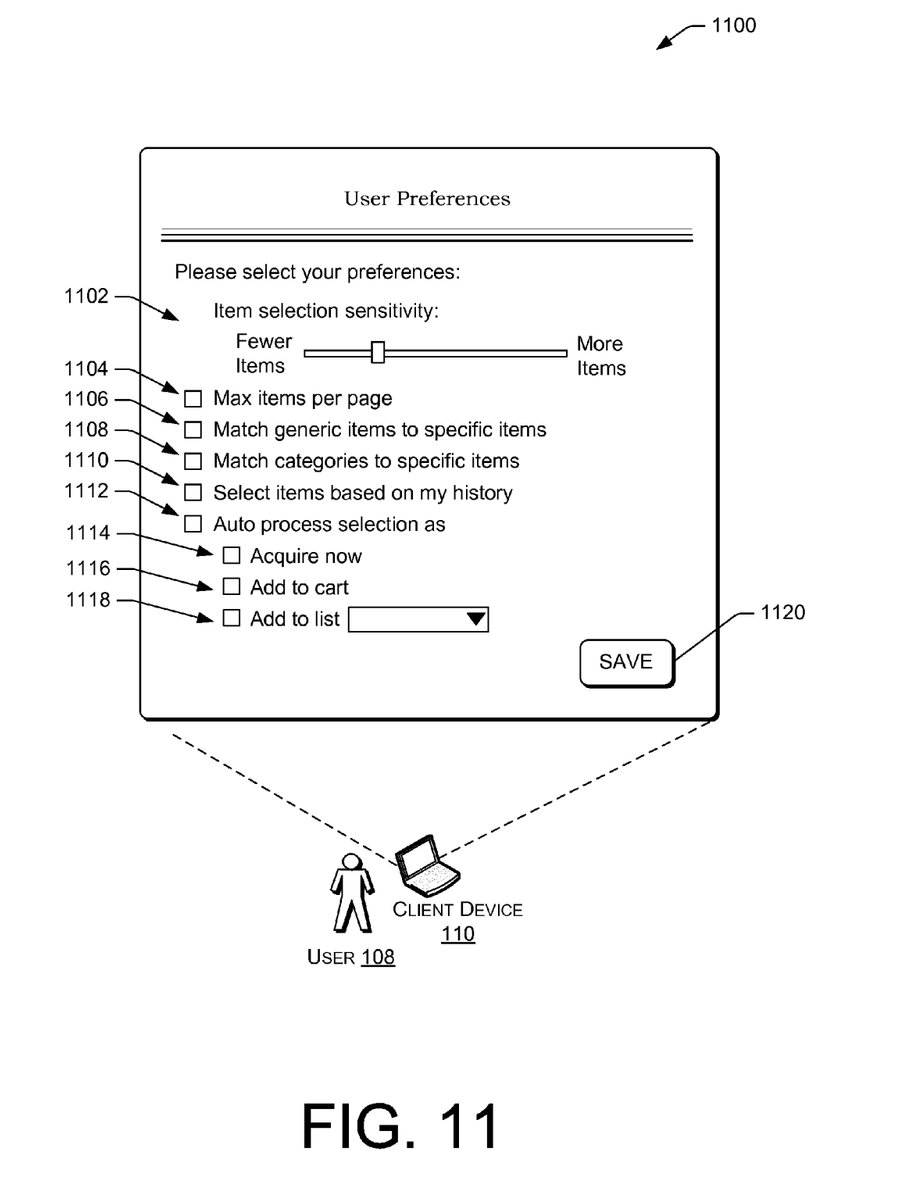
FIG. 11 is an illustrative user interface (UI) to select criteria used to select items in the content.

FIGS. 10 and 11 show various techniques to identify and/or select items in content based on criteria, which may be selected by the user, the service 102, and/or the content provider 104.

FIG. 10 is a flow diagram of an illustrative process 1000 to use criteria to select an item for association with a designator. The process 1000 may be performed at least in part by the text analyzer 134 and/or the content builder 136 of the service 102.

At 1002, the text analyzer 134 may obtain the content for analysis. At 1004, the text analyzer 134 may identify a portion of the content that is associated with an item or a group of items, which may be listed in the catalog 126. At 1006, the text analyzer 134 may select a specific item based at least in part on the portion of the content. For example, the text analyzer 134 may identify many items that match or are associated with the item or group of items in the portion of the content. The text analyzer 134 may then select at least one of the items as the specific item associated with the portion of content.

At 1008, the text analyzer 134 may determine whether the specific item satisfies selection criteria. The selection criteria may include criteria determined by the user 108, the service 102, and/or the content provider 104. For example, the criteria may restrict repeated use of designators for items already mentioned in the content, the criteria may pertain to items that do not interest the user (via predetermined selections, user history, etc.), and so forth. When the item does not satisfy the criteria then the text analyzer 134 may determine if more items require analysis at 1010. When more items exist, the process 1000 may move to the next item at 1012 and identify a specific item at 1006. In some embodiments, the specific items may be identified before the loop via the operation 1012, and then each item may then be examined to determine whether to add the designator at 1008.

When the item selection criteria are satisfied at 1008, the content builder 136 may generate the designator for the item for association with the portion of content at 1014.

At 1016, the text analyzer 134 may determine whether a designator threshold has been reached for a predetermined amount of text (e.g., number of words, paragraphs, pages, etc.) posted by the content provider 104, thus reducing clutter or excessive use of designators. When the designator threshold has not been reached at 1016, then the process may continue at 1010 as described above.

At 1018, the content builder may publish the designator with the portion of the content and thereby associate the specific item with the portion of content. The publication may include interaction with the API 120 and the post module 118 of the content provider 104.

In some embodiments, at 1010, when no additional items remain for analysis, the process may move to a decision at 1020 to determine whether designators have been generated. If designators have been generated at 1016 during the process 1000, then from the operation 1020, the process may publish the designators at 1018.

The process may end at 1022 after publication of the designators or after a determination that no designators exist for the content from the decision operation 1020.

FIG. 11 is an illustrative user interface (UI) 1100 to select criteria used to select items in content. A non-exhaustive list of possible criteria is shown in FIG. 11. The criteria are described as being modifiable by the user 108. However, some or all of the criteria may also be modified (determined) by the service 102 and/or the content provider 104.

In accordance with some embodiments, a sensitivity selector 1102 may enable the user 108 to have more or fewer items (designators) listed in the content. The sensitivity selector 1102 may apply the election to a specified amount of the content, such as a page, a post, a sentence, a paragraph, or another portion of the content. A max items selector 1104 may limit the total number of items (designators) per page of content.

A generic matching option 1106 may instruct the service 102 to match specific items to generic items as discussed above. Similarly, a categories match option 1108 may instruct the service 102 to match specific items to a category (or group) of items as discussed above.

In some embodiments, a history selector 1110 may instruct the service 102 to implement item selection (designator placement) based at least in part on user history. For example, in some instances, only items that may be related to the user's history are eligible to have designators. The user history may be available from the user account 128 via the service 102 and include transaction history, browsing history, designator activation history, etc., and/or a combination thereof.

In various embodiments, the UI 1100 may include an auto-process selector 1112 that enables the user 108 to determine an action to occur following a user-activation of the designator. The auto-process selector 1112 may include options that include an "acquire now" option 1114, an "add to cart" option 1116, and/or an "add to list" selector 1118, which may contain a list of available item lists (registries, etc.). Thus, when the "buy" selector is selected by the user 108 and then the user subsequently selects a designator associated with a portion of content posted by the content provider 104, the designator may initiate acquisition of the item, such as via presentation of a mini-layer (e.g., pop-up, etc.) that enables the user to complete the acquisition (e.g., download, physical delivery, etc.). The UI 1100 may include a save command 1120 to save selections on the UI.

Illustrative Selection Processing

Figure 12:
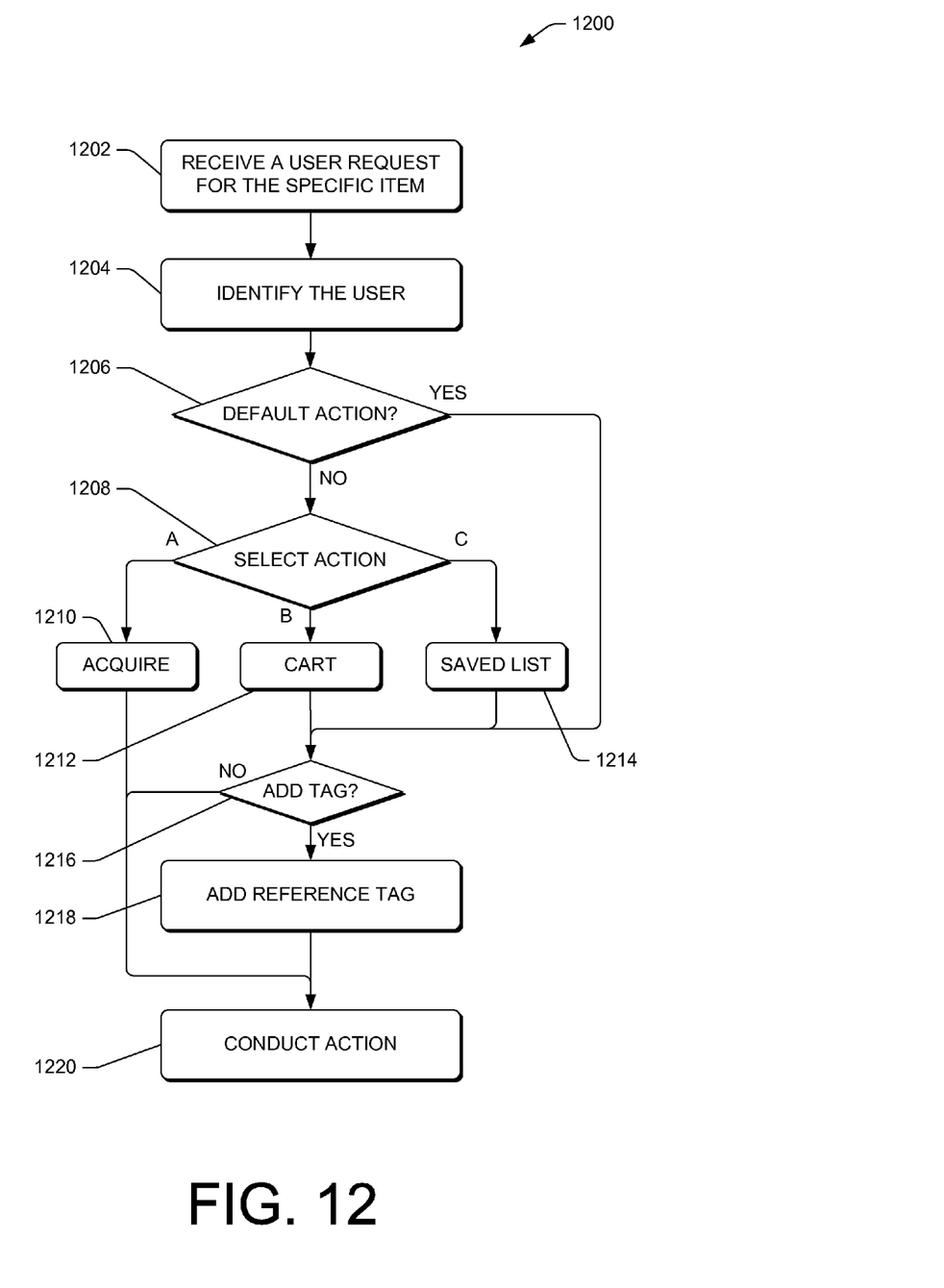
FIG. 12 is a flow diagram of an illustrative process to identify an action to perform using item information following selection of a designator of an item.
Figure 13:
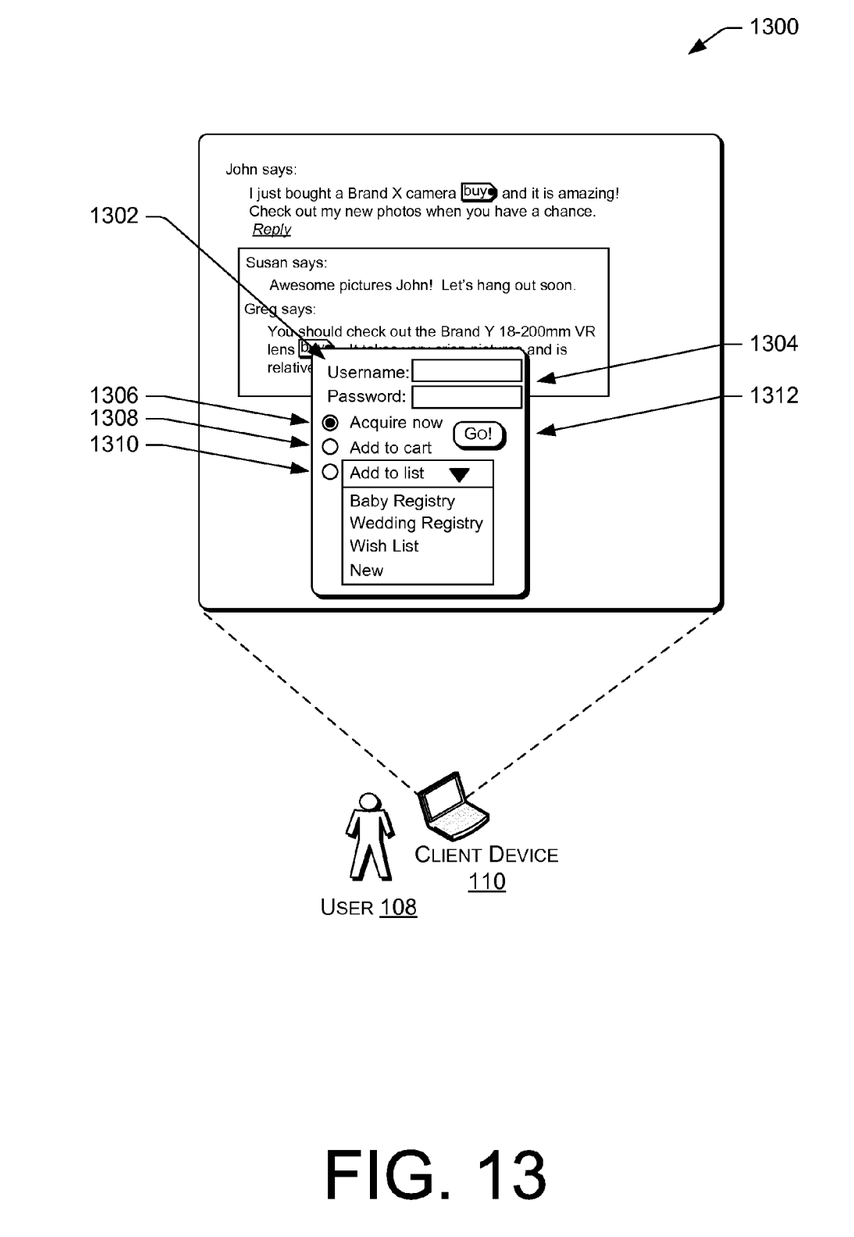
FIG. 13 is an illustrative environment that includes a UI to select an acquisition or association of an item after selection of a designator.

FIGS. 12 and 13 show various techniques to identify an action for the service 102 to perform following a user selection of a designator.

FIG. 12 is a flow diagram of an illustrative process 1200. At 1202, the service 102 may receive a user request (selection) of a designator for a specific item. At 1204, the service 102, via the authenticator 138, may identify the user 108 such as by requesting and receiving correct user credentials associated with a user account of the user 108.

At 1206, the account manager 140 may determine whether the user 108 (via the UI 1100), the service 102, and/or the content provider 104 have selected or implemented a default action in response to the user selection of the designator. The default actions may include one of acquire the item, add the item to a virtual cart, save the item to a list, among possible default selections. For example default action may be selected via the UI 1100 via the auto-process selector 1112.

When a default action is not available at 1206, then an action is selected via a decision 1208. Possible actions may include an acquire option at 1210, an "add to cart" option at 1212, an "add to saved list" option at 1214, among other possible actions.

In some instances, when the item is stored in a list, the user 108 may be interested to know how the item was added to the list after a passage of time. Upon selection of the "add to cart" option 1212, the "save to list" option 1214, or following detection of a default action at 1206, the account manager 140 may determine whether to add a back-reference tag to the item at 1216. The tag may be metadata that may indicate the source of the item. For example, the tag may include a time/date the designator is selected by the user, the content associated with the item via the content provider 104, or other data that may be helpful to add context to the item. The reference tag may be added and/or associated with the item at 1218. In some embodiments, the user may be prompted to type of select content of the tag, such as to type a note that may later remind the user of some information related to the item.

At 1220, the account manager 140 may perform the requested action following the any one of the acquire selection at 1210, a declining of the add tag selection at 1216, and the addition of the reference tag at 1218.

FIG. 13 is an illustrative environment 1300 that includes a UI 1302 to select an acquisition or association of an item after selection of a designator, among other possible options and/or information. The UI 1302 may include a user credentials input 1304 to enable secure access to the user account of the user 108. In some embodiments, the user credentials may satisfied and/or supplied by cookies stored by a browser or other application, tokens, or other authentication techniques, and thus the user credentials input 1304 may be omitted from the UI 1302 in these embodiments. The UI 1302 may be implemented as a pop-up, a mini-layer, or another type of UI that may maintain the user on a site hosted by the content provider 104, thereby minimizing disruption of the user experience with the content provider 104. In some embodiments, the UI 1302 may be presented to enable the operation 1208 of selecting the action as discussed with reference to the process 1200.

The UI 1302 may include selections such as an "acquire now" option 1306, an "add to cart" option 1308, and an "add to list" option 1310 to create an action for the item. The "acquire now" option 1306 may result in an initiation of a download or other acquisition (physical, digital, etc), of the item. The "add to list" option may include various registries and/or item trackers and/or an option to start a new list. A command 1312 may implement selections from the UI.

In some embodiments, the UI 1302 also include information about the specific item, such as when the specific item is not evident from the content. The item information may be presented in the UI 1302 similar to the information presented in the additional information 406 shown in FIG. 4.

Illustrative Browser Tool

Figure 14:
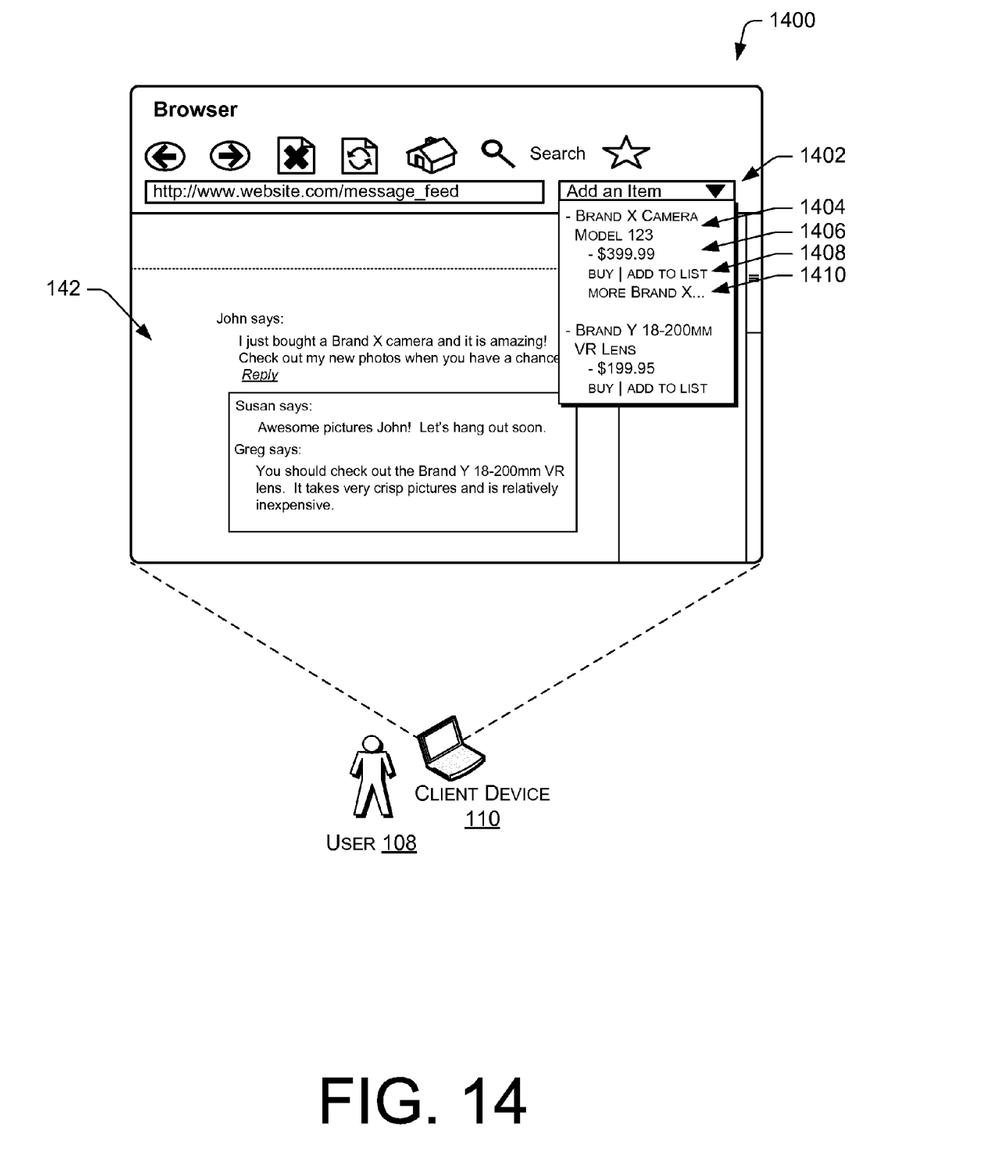
FIG. 14 is an illustrative browser tool to provide universal item location and acquisition.

FIG. 14 is an illustrative browser tool 1400 to provide universal item location and acquisition. The browser tool 1400 may be a plug-in for a browser or other client application that runs on the client device 110 and performs operations in conjunction with the service 102. The browser may enable identifying portions of content of a loaded page that are associated with specific items in the catalog 126. The browser tool 1400 may create designators for the specific items regardless of the content source. Thus, any content provider may provide content that can be loaded by the browser. The browser tool 1400 may identify the portions of the content that can be associated with specific items, as discussed at least in part in the processes 800, 1000, and 1200.

In accordance with some embodiments, the browser tool 1400 may include a selection UI 1402 that enables the user 108 to access items that are identified from the content 142. The selection UI 1402 may include one or more designator(s) 1404 that are selectable by the user to initiate acquisition and/or association of the item signified by the designator. In some instances, the designator 1404 may include the name of the item. The selection UI 1402 may also include a price 1406, an action command 1408 to enable the user 108 to acquire or associate the item with the user account, and a more information selector 1410, among other possible pieces of information. The selection UI 1402 may list multiple items, such as all the items for a page, recent browsing activity (e.g., items in the last week, etc.), and so forth.

In various embodiments, the browser tool 1400 may be implemented to insert the designators in line with the text of the content. The browser tool 1400 may load content from a source, such as the content provider 104. The browser tool 1400 may the identify portions of content that are associated with specific items. Finally, the browser tool 1400 may rewrite the source code of the content to insert the designators, possibly as links, icons, or other selectable features, within the code that associate the specific item to the respective portion of content. Thus, the browser tool 1400 may modify the source code to insert information about items, which is obtained by the service 102 and modifies content from another source, such as the content provider 104.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
    under control of one or more computer systems of a service configured with specific executable instructions,
    receiving content from a content provider that is separate from the service;
    identifying a portion of the content that is associated with a specific item, the specific item being available for consumption from the service;
    determining that the specific item satisfies a selection criterion used to indicate instances in which designators are to be associated with portions of the content, wherein the selection criterion comprises a predetermined user interest that is based at least in part on user transaction history;
    in response to the determining that the specific item satisfies the selection criterion, associating a designator with the portion of the content to signify the specific item;
    transmitting the designator to the content provider for publication with the content;
    receiving an indication that a user has activated the designator within the content while the user is accessing a site hosted by the content provider; and
    at least partly in response to the receiving of the indication:
    identifying a user account of the user maintained at the service; and
    in response to the identifying the user account and while the user remains on the site hosted by the content provider, associating the specific item with the user account by storing an indication of the specific item in a list associated with the user account.

2. The method as recited in claim 1, wherein the identifying the portion of the content that is associated with the specific item is performed at least in part by mapping the portion of the content to the specific item using a catalog of items that maps specific items to at least one of a generic item or a group of generic items described by the portion of the content.

3. The method as recited in claim 1, further comprising initiating a fulfillment process to provide the specific item to the user.

4. The method as recited in claim 1, wherein the associating the specific item with the user account includes adding the specific item to at least one of an item registry or a virtual cart that is stored in the user account of the user.

5. The method as recited in claim 1, wherein the designator is implemented as at least one of stylized text of the portion of the content or an icon associated with the portion of the content.

6. A method, comprising:
    under control of one or more computing devices configured with specific computer-executable instructions,
    identifying, within content published by a content provider, a portion of the content that is associated with a specific item, the specific item being available for consumption from a service that is different than the content provider;
    determining that the specific item satisfies a selection criterion used to indicate instances in which designators are to be associated with portions of the content, wherein the selection criterion comprises a predetermined user interest that is based at least in part on user transaction history;
    in response to the determining that the specific item satisfies the selection criterion, generating a designator for association with the portion of the content to signify the specific item;
    transmitting the designator to the content provider for publication proximate the portion of the content;
    receiving an indication that a user has activated the designator within the portion of the content while the user is accessing a site hosted by the content provider; and
    in response to the receiving the indication and while the user remains on the site hosted by the content provider, storing an indication of the specific item in a list associated with a user account of the user maintained by the service.

7. The method as recited in claim 6, further comprising:
    identifying the user account of the user maintained at the service upon receipt of correct user credentials from the user; and
    performing the storing the indication of the specific item in the list associated with the user account to enable the user to acquire the specific item after the identifying of the user account.

8. The method as recited in claim 7, wherein the storing the indication of the specific item in the list associated with the user account includes at least one of:
    adding the specific item to a virtual cart, or
    adding the specific item to an item registry that tracks items.

9. The method as recited in claim 6, wherein the predetermined user interest is further based at least in part on previous user interaction with other designators.

10. The method as recited in claim 6, wherein the transmitting the designator to the content provider includes transmitting a reply post to a message published as the content by the content provider, the reply post including the designator and a name of the specific item.

11. The method as recited in claim 6, further comprising scraping an electronic site hosted by the content provider to obtain the content.

12. The method as recited in claim 6, further comprising identifying another portion of the content that is associated with another specific item and generating a respective designator when a quantity of generated designators is below a threshold value for a predetermined amount of the content.

13. The method as recited in claim 6, wherein the identifying the portion of the content that is associated with the specific item is performed at least in part by mapping portions of the content to a catalog of items, at least some of the portions being associated with respective specific items by an item mapping in the catalog.

14. The method as recited in claim 6, wherein the designator is implemented as at least one of an icon or stylized text of the portion of the content.

15. The method as recited in claim 6, further comprising:
   identifying another portion of the content that is associated with another specific item; and
   refraining from generating a respective designator for association with the another portion of the content to signify the another specific item when the another portion of the content is associated with a disapproval of the another specific item in the content.

16. The method as recited in claim 6, wherein the portion of the content includes at least one image having metadata that includes text that is associated with the specific item.

17. A method comprising:
   under control of one or more computing devices configured with specific computer-executable instructions,
   generating content for electronic publication, the content including at least a portion that is associated with a specific item, the specific item being available for consumption from a service;
   determining that the specific item satisfies a selection criterion used to indicate instances in which designators are to be associated with portions of the content, wherein the selection criterion comprises a predetermined user interest that is based at least in part on user transaction history;
   in response to the determining that the specific item satisfies the selection criterion, transmitting the content to the service to associate the specific item with the portion using a designator;
   receiving the designator from the service;
   publishing the content with the designator;
   receiving, from a user, an activation of the designator within the published content while the user is accessing a site hosted by the content provider; and
   transmitting, at least partly in response to the receiving of the activation and while the user remains on the site hosted by the content provider, a request to the service to store an indication of the specific item in a list associated with a user account of the user maintained by the service.

18. The method as recited in claim 17, further comprising providing the user with a selection of available actions that, upon selection, cause the transmitting of the request to the service to store the indication of the specific item.

19. The method as recited in claim 18, wherein the available actions include initiating an acquisition process to provide the specific item to the user.

20. The method as recited in claim 17, wherein the transmitting the request to the service includes transmitting a reference tag that includes at least one of a time or a textual description related to the activation of the designator.

21. The method as recited in claim 17, further comprising receiving user credentials from the user to enable the user to access the user account maintained by the service.

\* \* \* \* \*